United States Patent
Chang et al.

(10) Patent No.: US 7,192,177 B2
(45) Date of Patent: Mar. 20, 2007

(54) BACKLIGHT MODULE WITH FRAME HAVING FLEXIBLE PRINTED CIRCUIT BOARD FIXED THEREIN

(75) Inventors: Cheng-Fan Chang, Miao-Li (TW); Kuan-Sheng Chen, Miao-Li (TW)

(73) Assignee: Innolux Display Corp., Miao-Li (TW)

( * ) Notice: Subject to any disclaimer, the term of this patent is extended or adjusted under 35 U.S.C. 154(b) by 0 days.

(21) Appl. No.: 11/403,702

(22) Filed: Apr. 13, 2006

(65) Prior Publication Data

US 2006/0232999 A1    Oct. 19, 2006

(30) Foreign Application Priority Data

Apr. 15, 2005    (TW) .............................. 94205942 U

(51) Int. Cl.
*F21V 7/04*    (2006.01)
(52) U.S. Cl. ...................... 362/631; 362/613; 362/632; 362/633; 362/634; 349/58
(58) Field of Classification Search ................ 362/613, 362/631, 632–634; 349/58
See application file for complete search history.

(56) References Cited

U.S. PATENT DOCUMENTS

2004/0257791 A1* 12/2004 Chen et al. .................... 362/31
2005/0254260 A1* 11/2005 Li .............................. 362/633

FOREIGN PATENT DOCUMENTS

TW            222.543        10/2004

* cited by examiner

*Primary Examiner*—Stephen F Husar
*Assistant Examiner*—Meghan K. Dunwiddie
(74) *Attorney, Agent, or Firm*—Wei Te Chung

(57) ABSTRACT

A liquid crystal display module includes a frame, a light guide plate, a diffusion sheet, at least one prism sheet, a liquid crystal display panel, a first power/single printed circuit board, a second power/single printed circuit board, a light emitting element and a reflective sheet. The frame includes a contain portion and a groove. The contain portion contains the light guide plate. The diffusion sheet and the prism sheet are arranged on the light guide plate sequentially. The liquid crystal display panel is arranged on the prism sheet. The first power/single printed circuit board connects with the liquid crystal display panel and further includes a first optical film. The second power/single printed circuit board is contained in the groove. The light emitting element is arranged on the second power/single printed circuit board. The reflective sheet is adjacent to the frame opposite to the light guide plate.

8 Claims, 5 Drawing Sheets

BACKLIGHT MODULE WITH FRAME HAVING FLEXIBLE PRINTED CIRCUIT BOARD FIXED THEREIN

FIELD OF THE INVENTION

The present invention relates to illumination devices, and more particularly to a backlight module for use in liquid crystal display (LCD) devices, the backlight module including a frame for fixing a flexible printed circuit board (PCB) thereto.

BACKGROUND

LCD devices have been widely used in notebooks, personal digital assistants (PDAs), cellular phones, and other electronic products because the price of LCDs is low and the quality of LCDs is high. LCDs are passive optical devices. Therefore in general a frontlight module or a backlight module needs to be attached to the LCD panel, in order to provide sufficient illumination to make the display of the LCD panel visible at night and to provide a full color display. Generally, the backlight module includes a light source and a diffusion sheet. The diffusion sheet is usually attached below the LCD panel, in order to disperse light beams received from the light source and provide uniform light for the LCD panel. The uniform light enables the LCD panel to display a clear image.

The light source of contemporary backlight modules is usually one of two types: a cold cathode fluorescent lamp (CCFL), or a light emitting diode (LED). The luminescent efficiency of the CCFL is relatively high. However, the CCFL is usually large, and the CCFL consumes more electricity. Therefore, the CCFL is generally only suitable for a large-sized multicolor display requiring high brightness levels. In contrast, the luminescent efficiency of the LED is lower, the size of the LED is smaller, the emitted light of the LED is more focused, and the working lifetime of the LED is longer. In addition, when the LED wears out and needs to be discarded, the LED causes less pollution in the waste disposal cycle. Therefore, the LED is suitable for a monochromatic, electrically efficient, small sized product, such as an LCD panel used in a cellular phone or in a vehicular satellite navigation system.

Referring to FIGS. 6–7, a conventional backlight module 10 includes a flexible printed circuit board (FPCB) 11, a frame 13, three LEDs 15, and a light guide plate 17. The frame 13 includes a side (not labeled) with three notches 132, for receiving the LEDs 15 that are pre-attached on the FPCB 11.

In assembly, the light guide plate 17 is received in the frame 13, and then the FPCB 11 is adhered on the side of the frame 13 by a double-adhesive tape 19. Thereby, the LEDs 15 pre-attached on the FPCB 11 are contained in the corresponding notches 132.

With this configuration, the LEDs 15 pre-attached on the FPCB 11 are located in the notches 132 of the frame 13 without being fixed in position. The LEDs 15 are liable to be displaced if an LCD module employing the backlight module 10 encounters vibration or shock. If the LEDs 15 are displaced, some of the light beams emitted therefrom are liable to be lost. This in turn diminishes the display characteristics of the LCD module.

Accordingly, what is needed is a backlight module that can overcome the above-described deficiencies.

SUMMARY

An exemplary backlight module for liquid crystal display includes a frame, a light guide plate received in the frame, and a flexible printed circuit board with point light sources disposed thereon. The frame has a side wall with a fastener, and the flexible printed circuit board is fastened to the frame by the fastener. The point light sources are adjacent to a side wall of the light guide plate.

Other advantages and novel features will become more apparent from the following detailed description when taken in conjunction with the accompanying drawings. All the drawings are schematic.

DETAILED DESCRIPTION OF PREFERRED EMBODIMENTS

Reference will now be made to the drawings to describe the present invention in detail.

Figure 1:
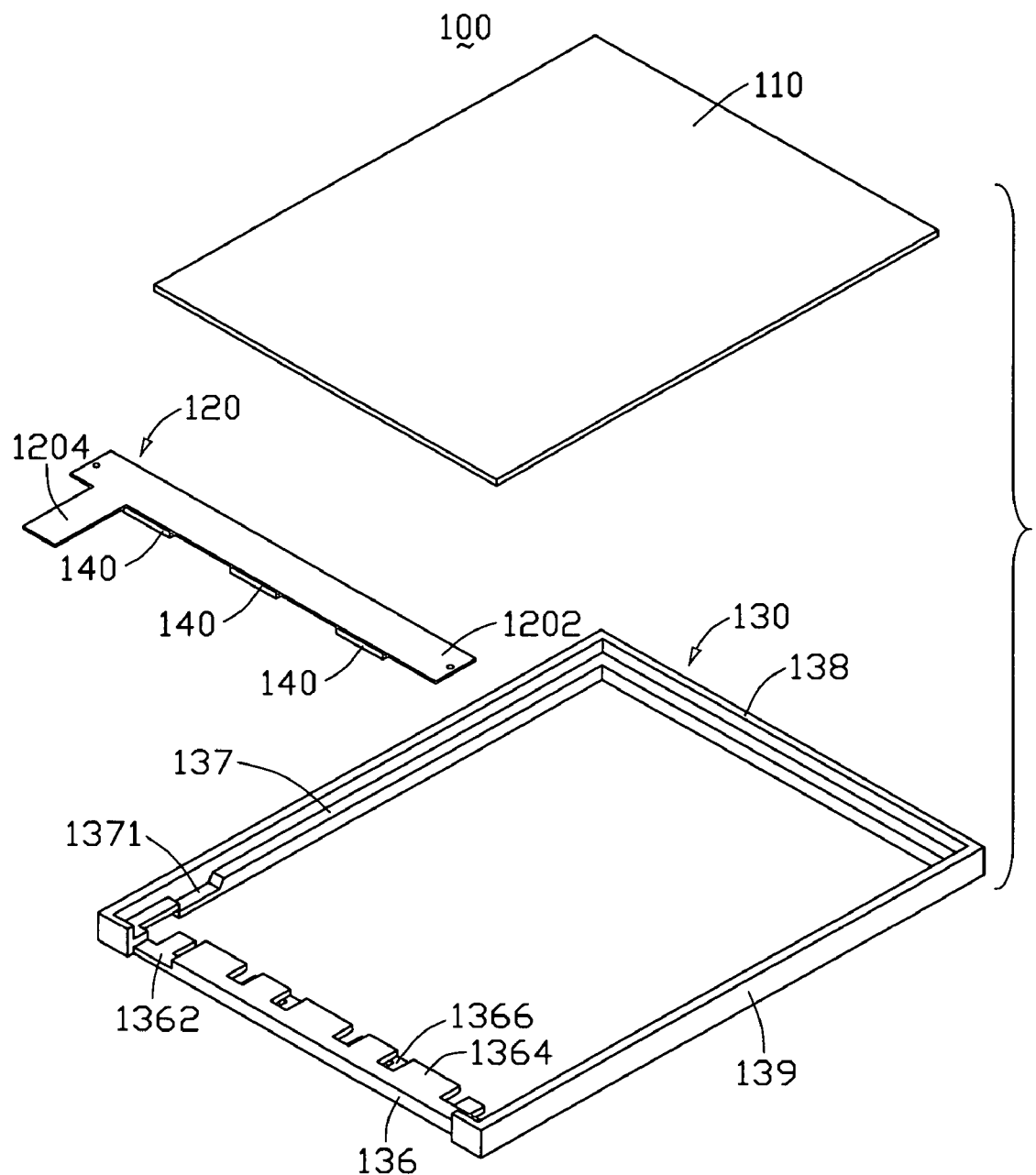
FIG. 1 is an exploded, isometric view of a backlight module according to a preferred embodiment of the present invention, the backlight module including a light guide plate, an FPCB and a frame.

Referring to FIG. 1, a backlight module according to a preferred embodiment of the present invention is shown. The backlight module 100 includes a light guide plate 110, a flexible printed circuit board (FPCB) 120, a frame 130, and a plurality of point light sources 140.

The frame 130 is preferably made of plastic. The frame 130 includes a first side wall 136, a second side wall 137, a third side wall 138, and a fourth side wall 139, which cooperatively define a space (not labeled) therebetween.

Figure 2:
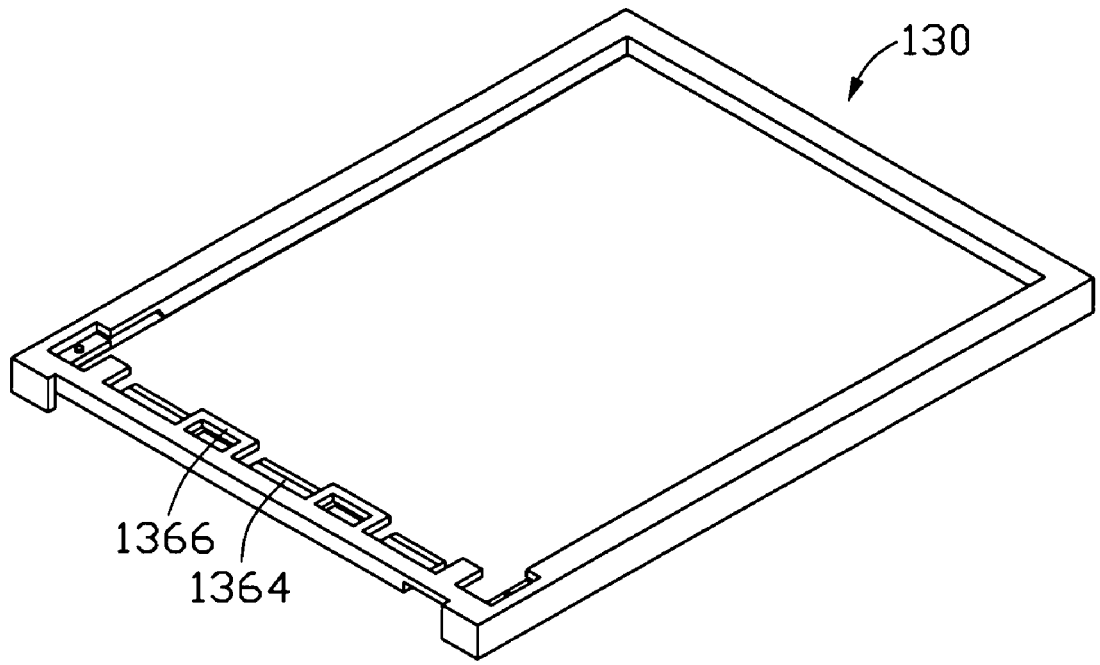
FIG. 2 is an isometric inverted view of the frame of the backlight module of FIG. 1.

The first side wall 136 includes a notch 1362, a top block arrangement 1364, and a bottom block arrangement 1366. The block arrangements 1364, 1366 are formed along an inside surface of the frame 130 at the first side wall 136, and extend into the space toward the third side wall 138. The top block arrangement 1364 includes five separate rectangular elastic blocks (not labeled) of different sizes. However, all five blocks are aligned, and extend into the space a same distance. In particular, two smaller blocks are interleavedly arranged between three larger blocks. Also referring to FIG. 2, the bottom block arrangement 1366 includes four separate rectangular elastic blocks (not labeled) of different sizes. However, all four blocks are aligned, and extend into the space a same distance. In particular, two middle blocks have a larger size, and two end blocks have a smaller size. Each of the middle blocks includes an opening (not labeled) therein. The two side blocks are disposed adjacent to the second and fourth side walls 137, 139 respectively. The second and fourth side walls 137, 139 each include a guiding groove 1371 located near the first side wall 136. Each guiding groove 1371 is open at a top thereof and at an end thereof nearest the first side wall 136. A portion of the second side wall 137 that bounds a bottom of the guiding groove 1371 thereat is level with a portion of the fourth side wall 139 that bounds a bottom of the guiding groove 1371 thereat; and said portions of the second and fourth side walls 137, 139 are both substantially level with top faces of the blocks of the bottom block arrangement 1366. The top and bottom block arrangements 1364, 1366 define a gap therebetween, for fastening the FPCB 120 therein.

The FPCB 120 includes a main illumination element supporting region 1202, and a connection strip 1204 extending perpendicularly from an end the illumination element supporting region 1202. The point light sources 140 are attached on the FPCB 120. The point light sources 140 are typically light emitting diodes (LEDs).

Figure 3:
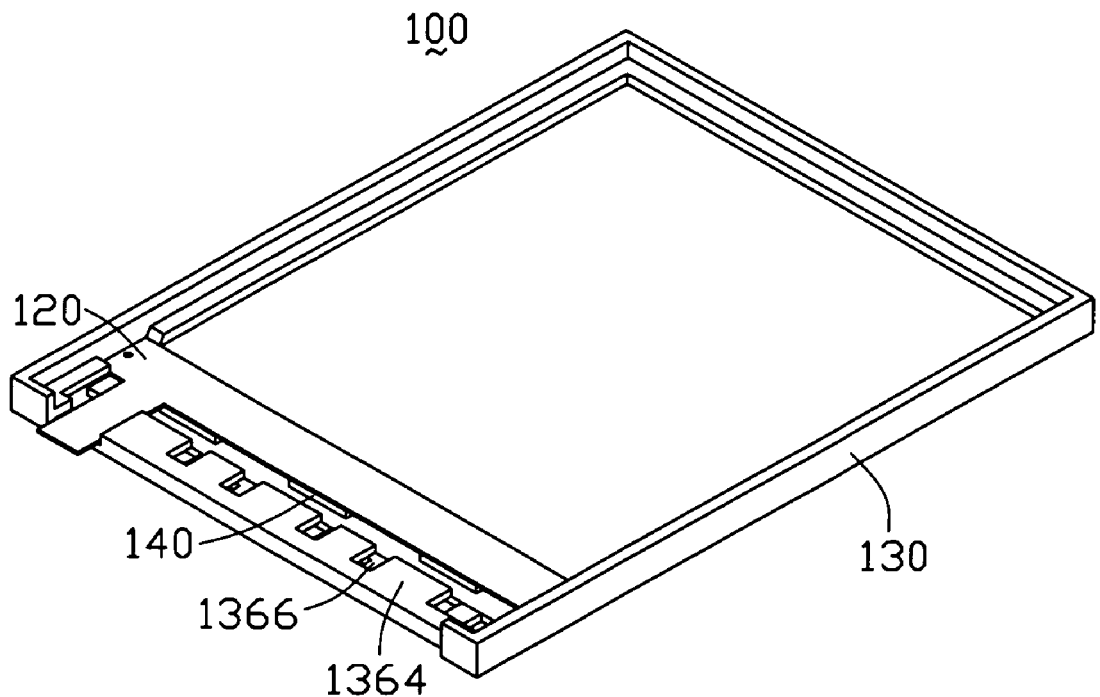
FIG. 3 is similar to FIG. 1, but not showing the light guide plate, and showing the FPCB attached to the frame in a preliminary position.
Figure 4:
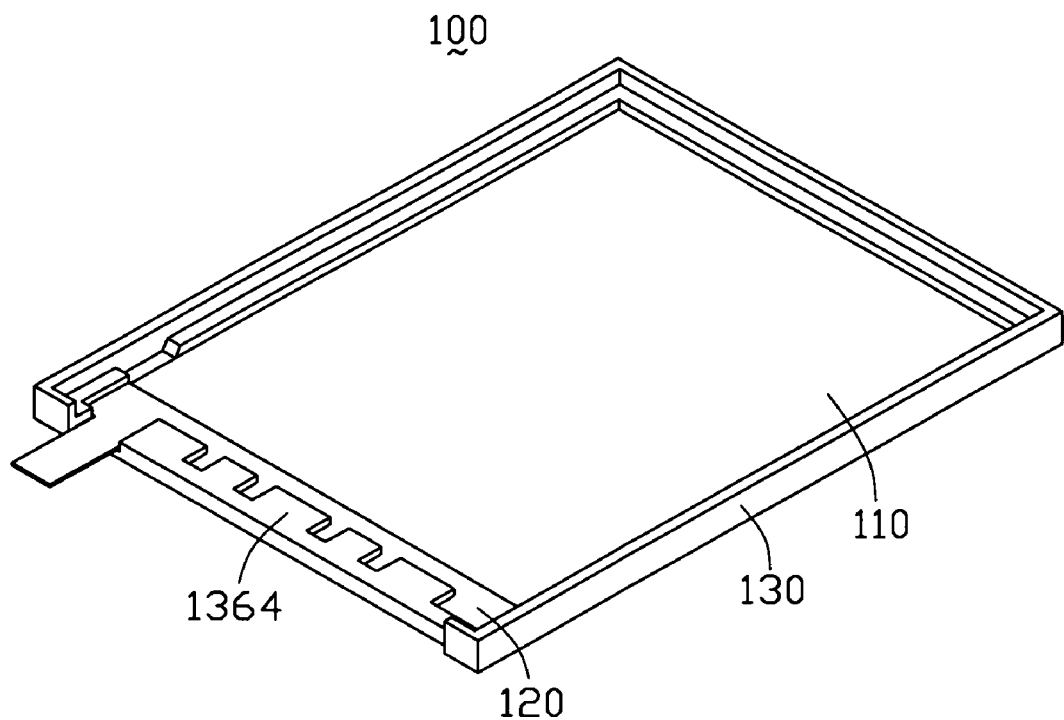
FIG. 4 is similar to FIG. 3, but showing the FPCB attached to the frame in a final position.
Figure 5:
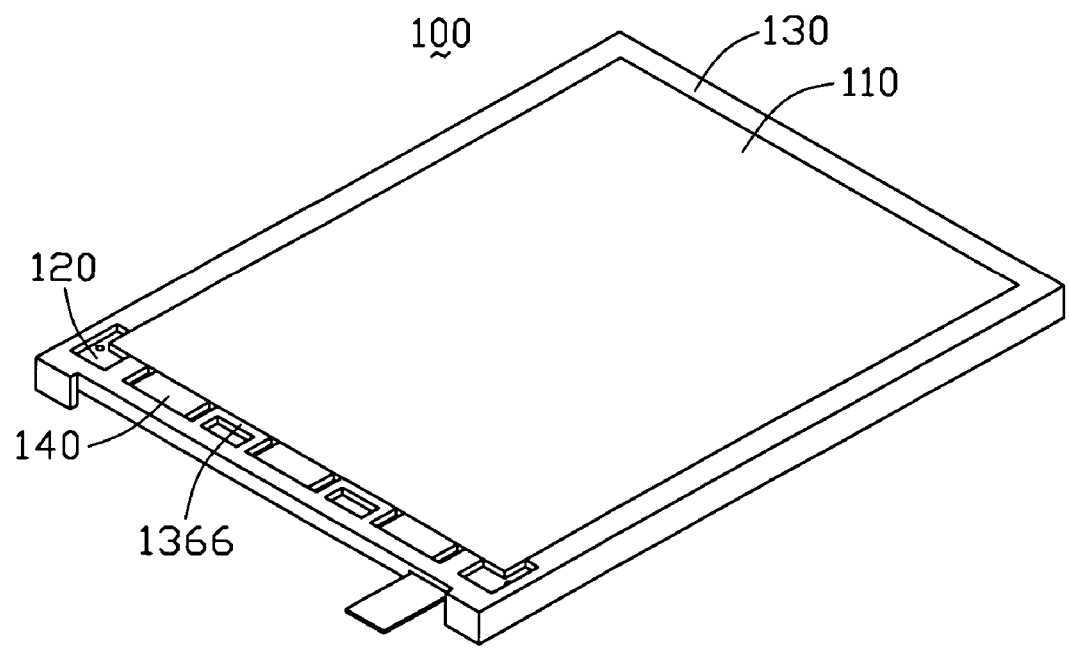
FIG. 5 is a similar to FIG. 4, but showing the frame with the FPCB inverted, and the light guide plate received in the frame, the assembly constituting the complete backlight module according to the preferred embodiment.
Figure 6:
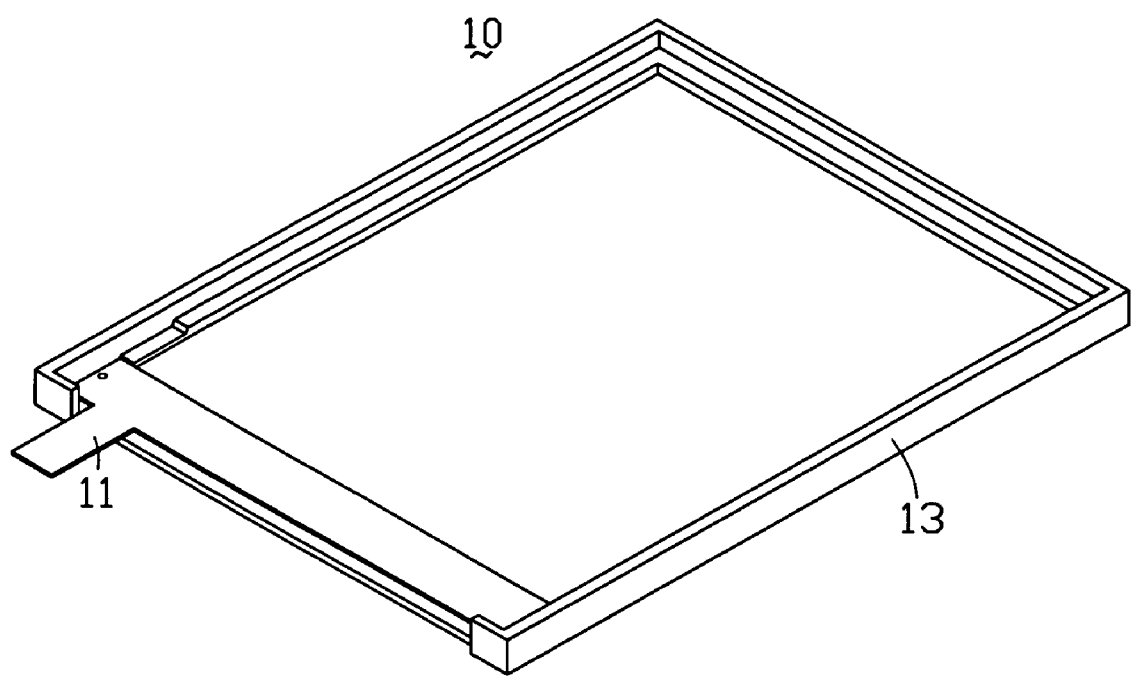
FIG. 6 is an isometric view of a conventional backlight module.
Figure 7:
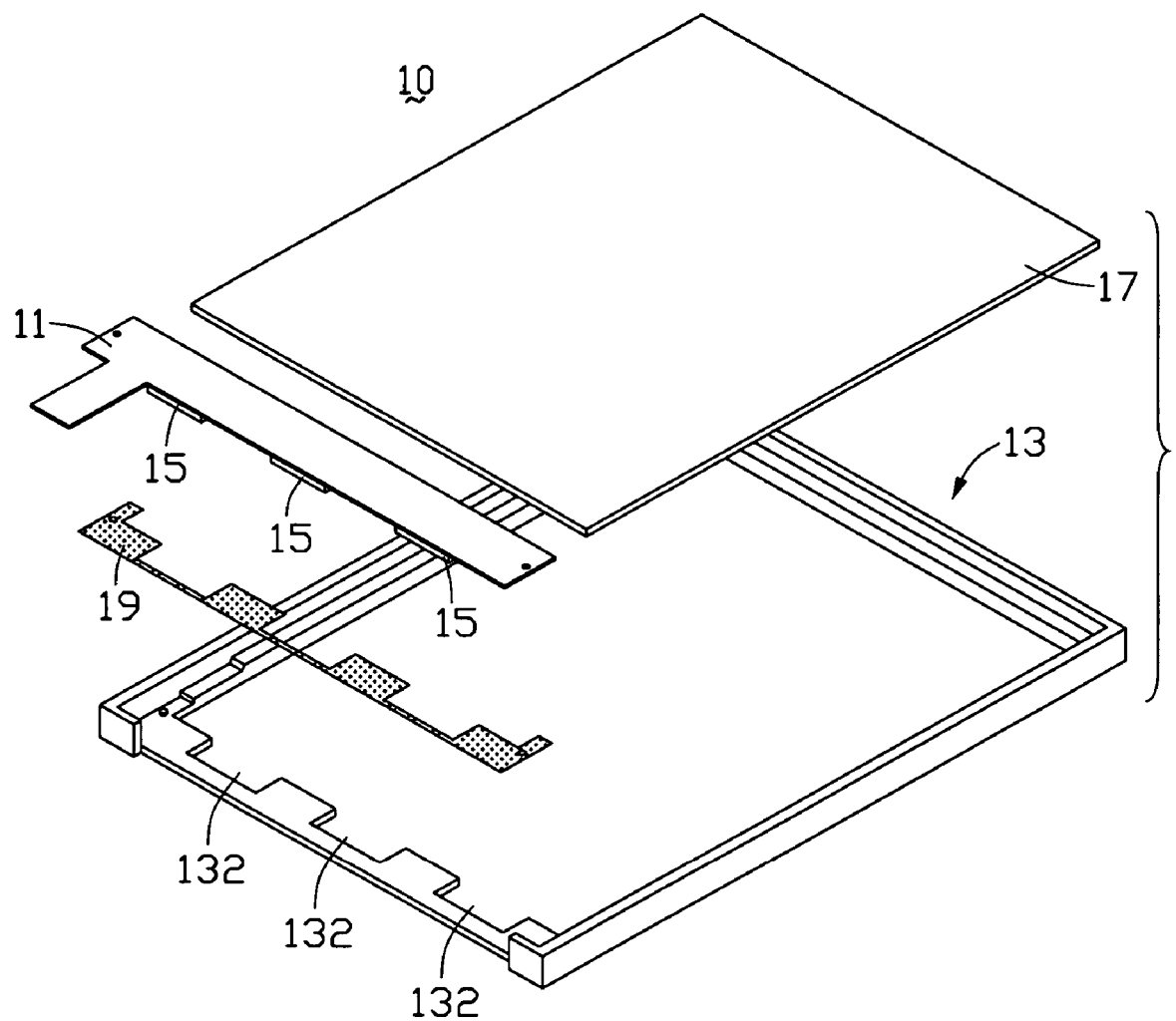
FIG. 7 is an exploded view of the backlight module of FIG. 6.

Referring to FIGS. 3–5, in assembly, the FPCB 120 with the point light sources 140 attached thereon is lowered down into the space of the frame 130. Opposite ends of the illumination element supporting region 1202 of the FPCB 120 are respectively received in the guiding grooves 1371 of the second and fourth side walls 137, 139, with the point light sources 140 being under the illumination element supporting region 1202. Then the FPCB 120 is slid toward the first side wall 136 and inserted into the gap between the top and bottom block arrangements 1304, 1306, so that the connecting region 1204 of the FPCB 120 is contained in the notch 1362 of the first side wall 136 and protrudes out from the first side wall 136. The point light sources 140 are fastened between corresponding of the blocks of the bottom block arrangement 1306. Afterward, the frame 130 with the FPCB 120 attached thereto is inverted. The light guide plate 110 is lowered down and arranged in the space of the frame 130, such that an end edge surface of the light guide plate 110 is abuts the point light sources 140.

With this configuration, the illumination element supporting region 1202 of the FPCB 120 is received in the gap between the top and bottom block arrangements 1364, 1366, and is thus stably fastened therein. Such fastening may be attained by way of interferential engagement of the FPCB 120 in the gap, and/or elastic deformation of any one or more of the blocks of the top and bottom block arrangements 1364, 1366. Thus if an LCD device that employs the backlight module 100 encounters vibration or shock, the point light sources 140 resist displacement. Moreover, the point light sources 140 are stably positioned in abutment with the end edge surface of the light guide plate 110. Therefore most if not all of light beams emitted by the point light sources 140 enter the light guide plate 110. This enables the LCD device to have high brightness and good display characteristics.

Various modifications and alterations are possible within the ambit of the invention herein. For example, the number of point light sources 140 is not limited to three, and may instead be two, four or another suitable number. According the number of point light sources 140, the numbers, shapes and sizes of the blocks of the top and bottom block arrangements 1364, 1366 can be configured accordingly.

It is to be understood, however, that even though numerous characteristics and advantages of the present embodiments have been set out in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A backlight module, comprising:
   a frame, the frame comprising a first side wall with a fastening portion and a notch, a second side wall, a third side wall, and a fourth side wall, the first, second, third and fourth side walls cooperatively defining a space therebetween, and the fastening portion comprising a top block arrangement and a bottom block arrangement;
   a light guide plate received in the space of the frame; and
   a flexible printed circuit board fastened to the frame by the fastening portion, the flexible printed circuit board having a plurality of point light sources disposed thereon, the point light sources being adjacent to a side wall of the light guide plate.

2. The backlight module as claimed in claim 1, wherein each of the top and bottom block arrangements extends from a main body of the first side wall into the space toward the third side wall, which is opposite from the first side wall.

3. The backlight module as claimed in claim 2, wherein the top block arrangement comprises a plurality of separate, aligned elastic blocks.

4. The backlight module as claimed in claim 3, wherein the bottom block arrangement comprises a plurality of separate, aligned elastic blocks.

5. The backlight module as claimed in claim 1, wherein the point light sources are light emitting diodes.

6. A backlight module, comprising:
   a frame with a side wall;
   a light guide plate received in the frame; and
   a flexible printed circuit board fastened to the frame, the flexible printed circuit board having a plurality of point light sources disposed thereon, the frame including a retention device independently holding the flexible printed circuit board in position without involvement with the light guide plate, wherein said retention device includes upper and lower plates sandwiching the flexible printed circuit board therebetween.

7. A backlight module, comprising:
   a frame with a side wall;
   a light guide plate received in the frame; and
   a flexible printed circuit board fastened to the frame, the flexible printed circuit board having a plurality of point light sources disposed thereon, the frame including a retention device including upper and lower plates with therebetween a slot receiving said flexible printed circuit board.

8. The backlight module as claimed in claim 7, wherein a guide groove is formed beside the retention device so as to guide said flexible printed circuit board to be initially vertically entered into the guide groove and successively horizontally moved into said slot.

* * * * *